(12) United States Patent
Brueger

(10) Patent No.: US 11,760,288 B1
(45) Date of Patent: Sep. 19, 2023

(54) BUMPER CAP RETENTION ASSEMBLY

(71) Applicant: Leon Brueger, Riverton, UT (US)

(72) Inventor: Leon Brueger, Riverton, UT (US)

( * ) Notice: Subject to any disclaimer, the term of this patent is extended or adjusted under 35 U.S.C. 154(b) by 21 days.

(21) Appl. No.: 17/691,441

(22) Filed: Mar. 10, 2022

(51) Int. Cl.
B60R 19/48 (2006.01)

(52) U.S. Cl.
CPC .................................. B60R 19/48 (2013.01)

(58) Field of Classification Search
CPC ... B60R 19/48; B60R 11/06; B60R 2011/004; B60D 1/60; B60D 1/605
USPC .......................................... 293/102, 106, 117
See application file for complete search history.

(56) References Cited

U.S. PATENT DOCUMENTS

| | | | |
|---|---|---|---|
| 3,905,527 A | 9/1975 | Chamberlain | |
| 4,040,641 A | 8/1977 | Riecke | |
| 5,997,057 A | 12/1999 | Gasko | |
| 6,164,680 A * | 12/2000 | Kluhsman | B60D 1/60 |
| | | | 280/507 |
| 6,755,451 B2 | 6/2004 | Jones | |
| 6,874,805 B2 * | 4/2005 | Bagley | B60D 1/60 |
| | | | 280/507 |
| D677,203 S | 3/2013 | Russell | |
| 8,672,371 B1 * | 3/2014 | Russell | B60R 19/48 |
| | | | 293/106 |
| 10,821,927 B1 * | 11/2020 | Martin | B60R 15/00 |
| 2003/0218342 A1 * | 11/2003 | Jones | B60R 19/48 |
| | | | 293/117 |
| 2004/0046361 A1 * | 3/2004 | Lewis | B60D 1/60 |
| | | | 280/507 |

* cited by examiner

Primary Examiner — Jason S Morrow
Assistant Examiner — Wenwei Zhuo

(57) ABSTRACT

A bumper cap retention assembly includes an end cap that is insertable into an open end of a bumper on a recreational vehicle. A frame is provided that has a width and a length sufficient for extending around the bumper of the recreational vehicle. The frame has a plurality of lobes each extending outwardly from the frame. A bracket is provided which is positionable between respective ones of the lobes on the frame and the bracket is oriented to extend between respective members of the frame. The bracket extends across the end cap when the end cap is inserted into the open end of the bumper and the frame is positioned around the bumper. In this way the bracket inhibits the end cap from falling out of the open end of the bumper.

11 Claims, 4 Drawing Sheets

BUMPER CAP RETENTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to retention devices and more particularly pertains to a new retention device for retaining an end cap in an open end of bumper of a recreational vehicle. The device includes a frame that is positionable around the open end of the bumper and a plurality of lobes on the frame. The device includes a bracket that is pivotally attached to the frame such that the bracket extends across the end cap to retain the end cap in the open end of the bumper. The bracket is removable from the frame to facilitate the end cap to be removed from the open end of the bumper.

(2) Description of Related Art Including Information Disclosed Under 37 CFR 1.97 and 1.98

The prior art relates to retention devices including a hollow vehicle bumper that has a tray that slides out of an open end of the bumper. The prior art discloses a hitch receiver that has an end cap. The prior art discloses a blow molded bumper end cap for enhancing air flow into an engine compartment. The prior art discloses a rectangular frame that is positionable around an open end of a hitch receiver. The prior art discloses a recreational vehicle bumper that has a telescopic tube for storing a sewer hose. The prior art discloses an end cap for a recreational vehicle bumper.

BRIEF SUMMARY OF THE INVENTION

An embodiment of the disclosure meets the needs presented above by generally comprising an end cap that is insertable into an open end of a bumper on a recreational vehicle. A frame is provided that has a width and a length sufficient for extending around the bumper of the recreational vehicle. The frame has a plurality of lobes each extending outwardly from the frame. A bracket is provided which is positionable between respective ones of the lobes on the frame and the bracket is oriented to extend between respective members of the frame. The bracket extends across the end cap when the end cap is inserted into the open end of the bumper and the frame is positioned around the bumper. In this way the bracket inhibits the end cap from falling out of the open end of the bumper.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
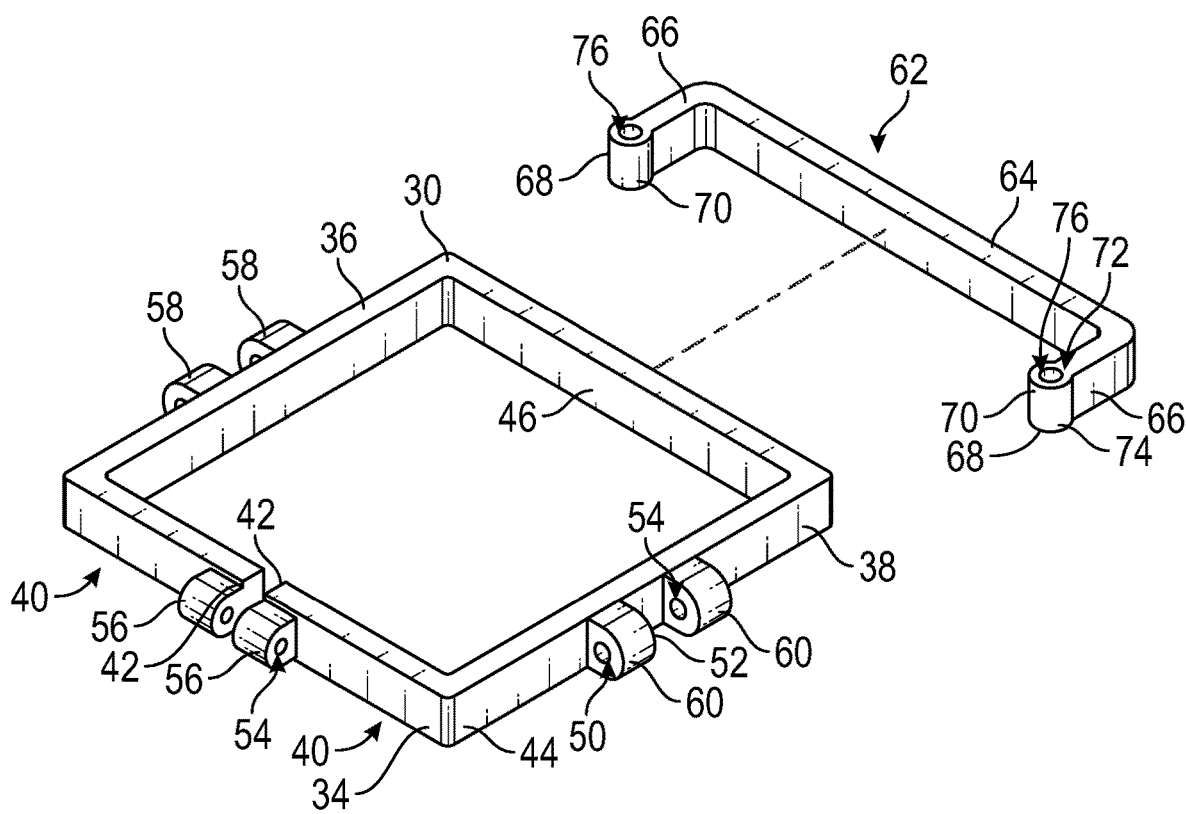
FIG. 1 is a perspective view of a bumper cap retention assembly according to an embodiment of the disclosure.
Figure 2:
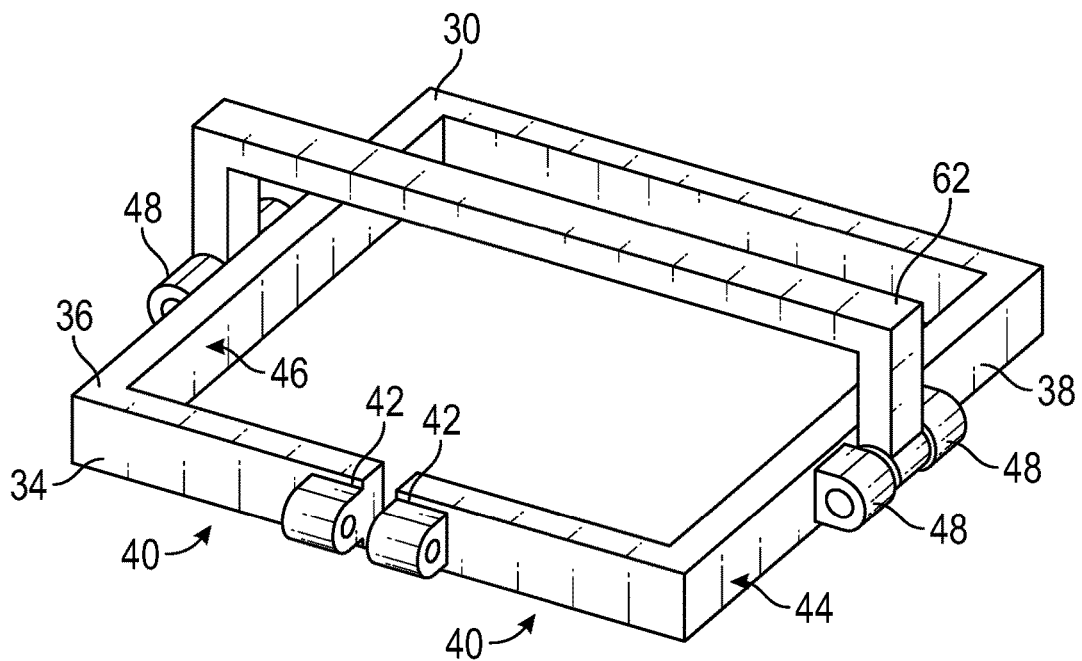
FIG. 2 is a top perspective view of an embodiment of the disclosure.
Figure 3:
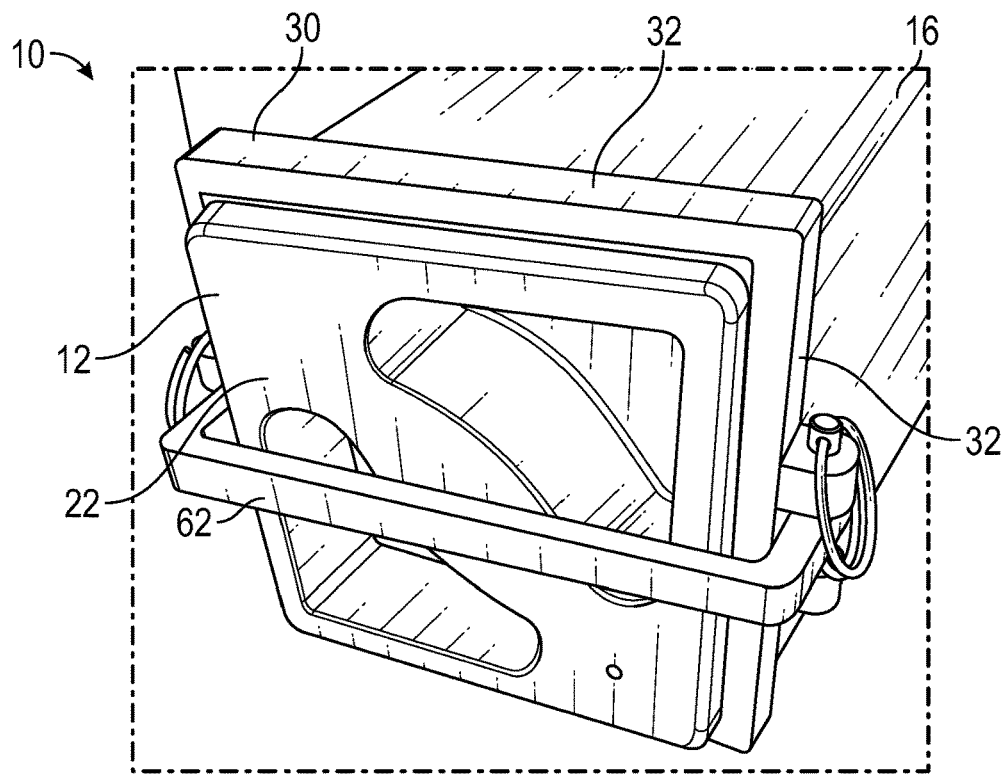
FIG. 3 is a perspective in-use view of an embodiment of the disclosure showing an end cap being retained in an open end of a bumper.
Figure 4:
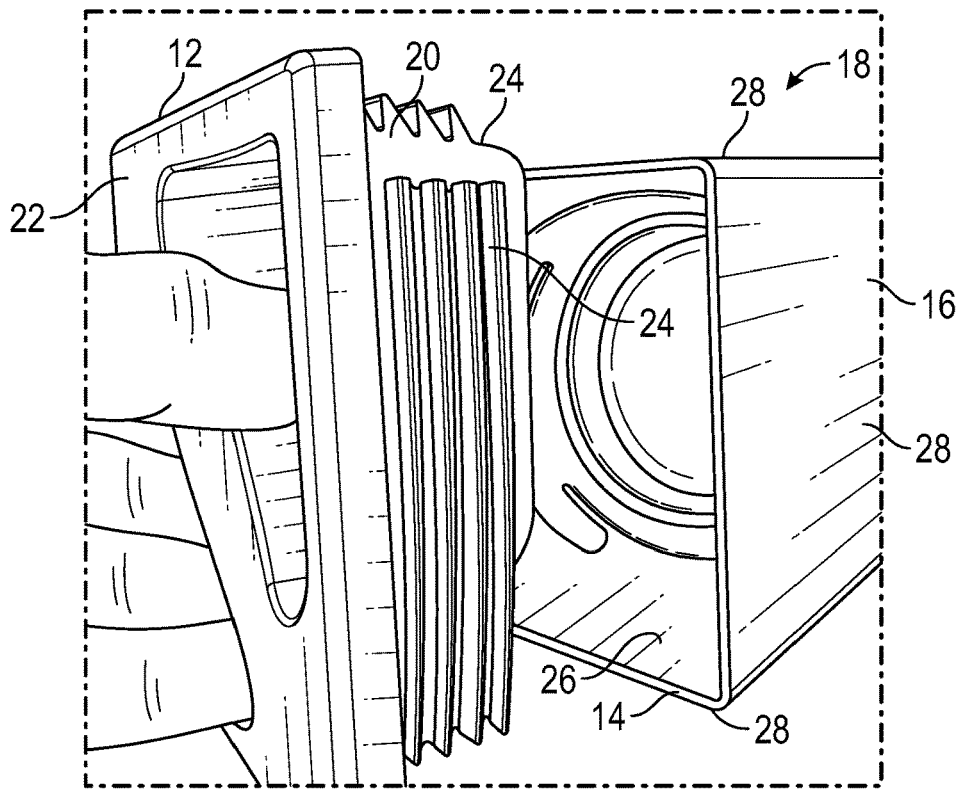
FIG. 4 is a perspective in-use view of an embodiment of the disclosure showing an end cap being removed from an open end of a bumper.
Figure 5:
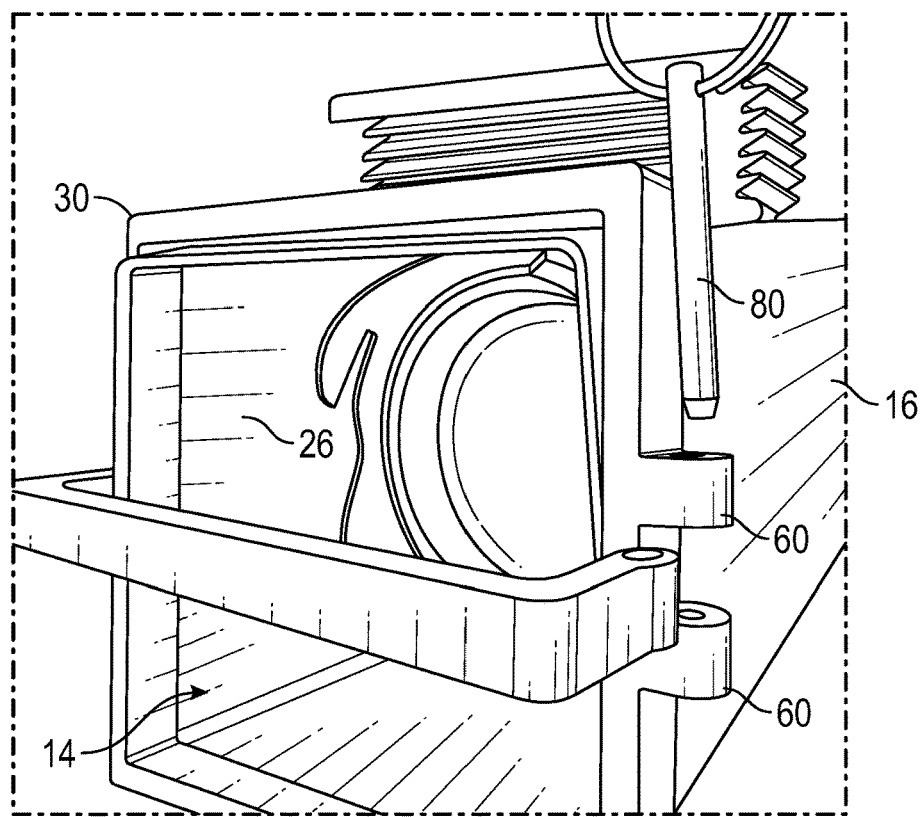
FIG. 5 is a perspective in-use view of an embodiment of the disclosure showing a bracket being uncoupled from a frame.
Figure 6:
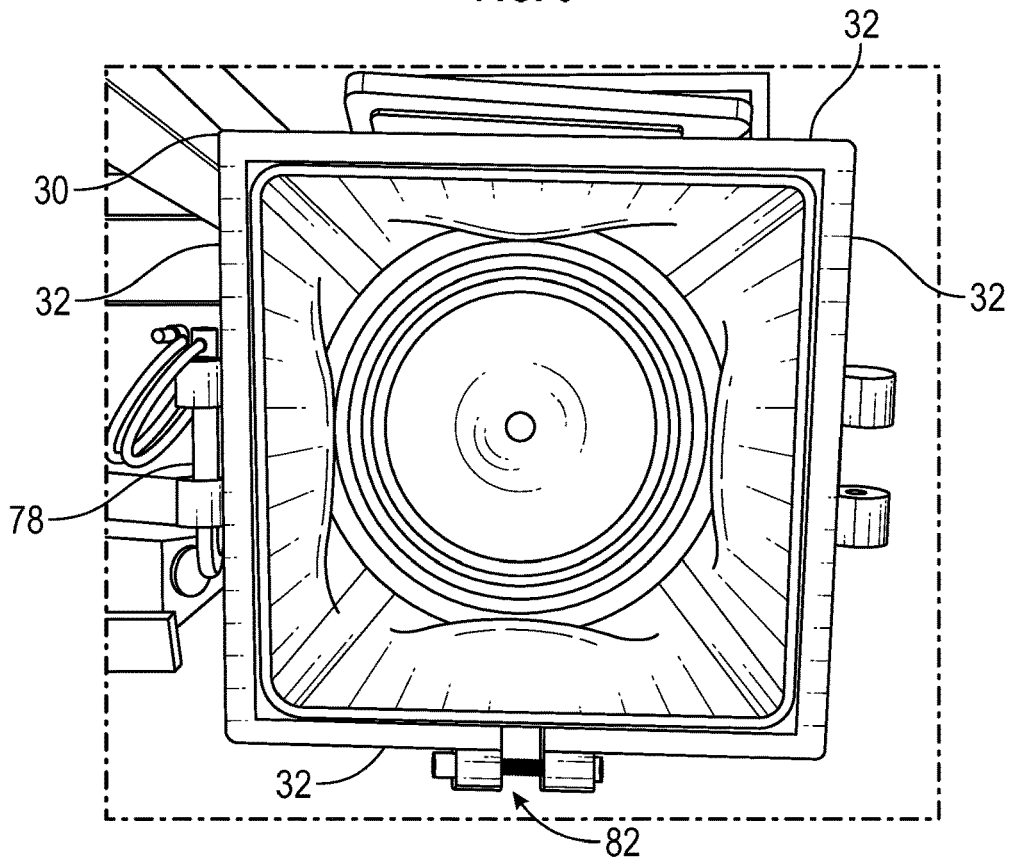
FIG. 6 is a perspective in-use view of an embodiment of the disclosure showing a sewer hose in a bumper.
Figure 7:
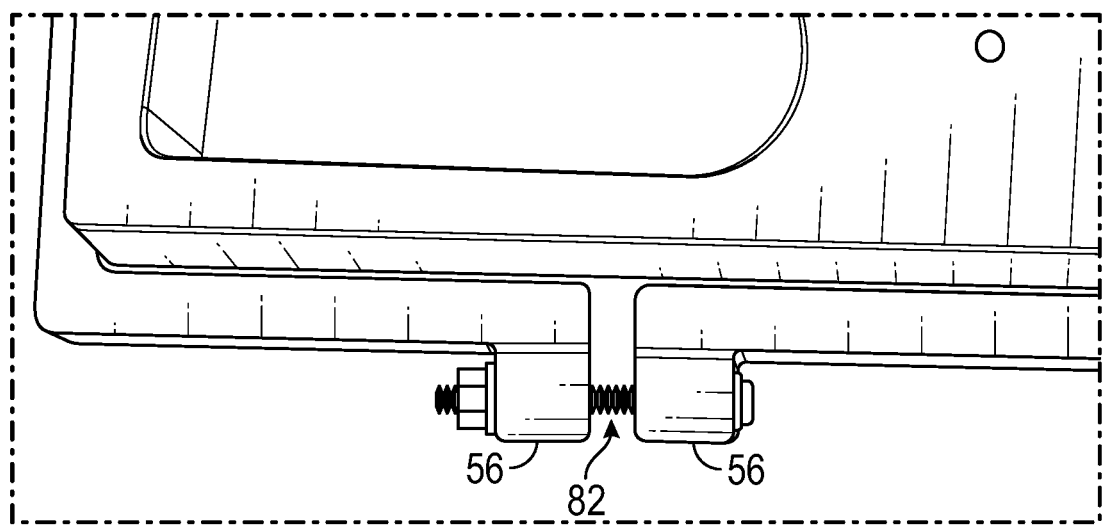
FIG. 7 is a perspective view of an embodiment of the disclosure showing a fastener engaging a pair of first lobes.
Figure 8:
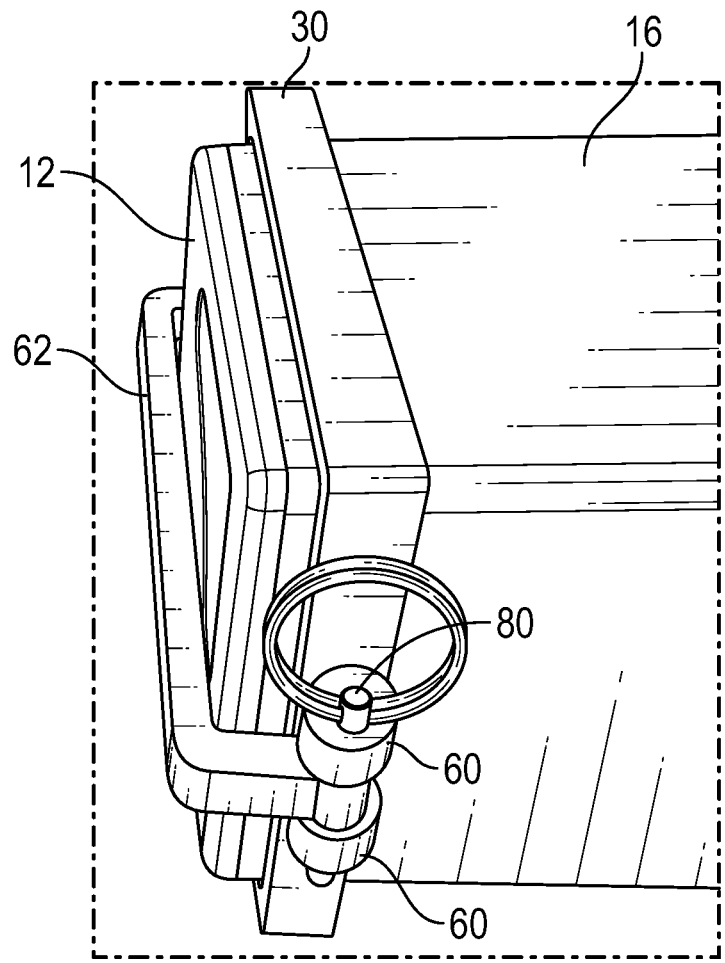
FIG. 8 is a perspective view of an embodiment of the disclosure showing a second pin engaging a pair of third lobes and a bracket lobe.

With reference now to the drawings, and in particular to FIGS. 1 through 8 thereof, a new retention device embodying the principles and concepts of an embodiment of the disclosure and generally designated by the reference numeral 10 will be described.

As best illustrated in FIGS. 1 through 8, the bumper cap retention assembly 10 generally comprises an end cap 12 that is insertable into an open end 14 of a bumper 16 on a recreational vehicle 18. The recreational vehicle 18 may be a motorized camper that has a sewer hose 19 which is stored in the bumper 16. The end cap 12 has an outer surface 20 and a front surface 22, and the outer surface 20 has a plurality of intersecting sides 24 such that the end cap 12 has a rectangular shape. Each of the intersecting sides 24 abuts an interior surface 26 of a respective one of a plurality of faces 28 of the bumper 16 has the front surface 22 closing the open end 14 of the bumper 16.

A frame 30 is provided which has a width and a length that is sufficient for extending around the bumper 16 of the recreational vehicle 18. The frame 30 comprises a plurality of members 32 intersecting each other at right angles such that the frame 30 defines a rectangle. The plurality of members 32 includes a first member 34, a second member 36 and a third member 38. The first member 34 extends between the second member 36 and the third member 38 such that the second member 36 and the third member 38 define opposite sides of the rectangle.

The first member 34 is divided into a pair of halves 40 and each of the halves 40 has a terminal end 42 that is directed toward each other. Each of the members 32 has an outwardly facing surface 44 and an inwardly facing surface 46. Each of the members extends along a respective one of the faces 28 of the bumper 16 having the inwardly facing surface 46 of each of the members 32 abutting an outer surface 20 of the respective face. The frame 30 has a plurality of lobes 48 each extending outwardly from the frame 30 and each of the lobes 48 is positioned on the outwardly facing surface 44 of a respective one of the members 32.

Each of the lobes 48 has a first lateral surface 50 and a second lateral surface 52, and each of the lobes 48 has a hole 54 extending through the first lateral surface 50 and the second lateral surface 52. The plurality of lobes 48 includes a set of first lobes 56, a set of second lobes 58 and a set of third lobes 60. Each of the first lobes 56 is positioned on the first member 34 and each of the first lobes 56 is positioned adjacent to the terminal end 42 of a respective one of the halves 40 of the first member 34. Each of the second lobes 58 is positioned on the second member 36 and the second lobes 58 are spaced apart from each other. Each of the third lobes 60 is positioned on the third member 38 and the third lobes 60 are spaced apart from each other. Each of the third lobes 60 is aligned with a respective one of the second lobes 58. The hole 54 in each of the first lobes 56 are directed toward each other, the hole 54 in each of the second lobes 58 are directed toward each other and the hole 54 in each of the third lobes 60 are directed toward each other.

A bracket 62 is provided and the bracket 62 is positionable between respective ones of the lobes 48 on the frame 30. The bracket 62 is oriented to extend between respective members 32 of the frame 30. The bracket 62 extends across the end cap 12 when the end cap 12 is inserted into the open end 14 of the bumper 16 and the frame 30 is positioned around the bumper 16. In this way the bracket 62 inhibits the end cap 12 from falling out of the open end 14 of the bumper 16. The bracket 62 comprises a central portion 64 extending between a pair of outward portions 66. Each of the outward portions 66 is perpendicularly oriented with the central portion 64 such that the bracket 62 has a U-shape. Additionally, each of the outward portions 66 has a distal end 68 with respect to the central portion 64.

The bracket 62 has a pair of bracket lobes 70 each integrated into the distal end 68 of a respective one of the outward portions 66. Each of the bracket lobes 70 has a front surface 72 and a back surface 74, and each of the bracket lobes 70 has an opening 76 extending through the front surface 72 and the back surface 74 of the bracket lobes 70. Each of the bracket lobes 70 is positioned between respective pairs of the second lobes 58 and pairs of the third lobes 60. Additionally, the opening 76 in each of the bracket lobes 70 is aligned with the hole 54 in the respective second lobes 58 and third lobes 60.

A first pin 78 is insertable through each of the hole 54 in the second lobes 58 and the opening 76 in the bracket lobe 70 which is positioned between the second lobes 58 for pivotally attaching the bracket 62 to the frame 30. A second pin 80 is insertable through the hole 54 in the third lobes 60 and the opening 76 in the bracket lobe 70 which is positioned between the third lobes 60 for pivotally attaching the bracket 62 to the frame 30. A fastener 82 is extendable through hole 54 in each of the first lobes 56 for urging the first lobes 56 toward each other to tighten the frame 30 around the bumper 16. The fastener 82 may comprise a screw or other type of releasable, mechanical fastener.

In use, the bracket 62 is positioned around the bumper 16 such that the bracket 62 is aligned with the open end 14 of the bumper 16 and the fastener 82 is tightened to retain the bracket 62 around the bumper 16. The end cap 12 is inserted into the open end 14 of the bumper 16 and the bracket 62 is positioned to extend across the end cap 12. The first pin 78 is inserted through the second lobes 58 and the respective bracket lobe 70 and the second pin 80 is inserted through the third lobes 60 and the respective bracket lobe 70. In this way the end cap 12 is retained in the open end 14 of the bumper 16. The first pin 78 is removed from the second lobes 58 and the respective bracket lobe 70 to facilitate the bracket 62 to be pivoted away from the end cap 12. In this way the end cap 12 can be removed from the open end 14 of the bumper 16 to access the sewer hose 19.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bumper cap retention assembly for retaining a bumper cap on a recreational vehicle bumper, said assembly comprising:
   an end cap being insertable into an open end of a bumper on a recreational vehicle;
   a frame having a width and a length being sufficient for extending around said bumper of said recreational vehicle, said frame comprising a plurality of members intersecting each other at right angles such that said frame defines a rectangle, said frame has a plurality of lobes each extending outwardly from said frame; and
   a bracket being positionable between respective ones of said lobes on said frame, said bracket being oriented to extend between respective members of said frame, said bracket extending across said end cap when said end cap is inserted into said open end of said bumper and said frame is positioned around said bumper thereby inhibiting said end cap from falling out of said open end of said bumper.

2. The assembly according to claim 1, wherein:

said plurality of members includes a first member, a second member and a third member, said first member extending between said second member and said third member such that said second member and said third member define opposite sides of said rectangle;

said first member is divided into a pair of halves, each of said halves having a terminal end being directed toward each other;

each of said members has an outwardly facing surface and an inwardly facing surface, each of said members extending along a respective one of said faces of said bumper having said inwardly facing surface of each of said members abutting an outer surface of said respective face.

3. The assembly according to claim 2, wherein each of said lobes is positioned on said outwardly facing surface of a respective one of said members, each of said lobes having a first lateral surface and a second lateral surface, each of said lobes having a hole extending through said first lateral surface and said second lateral surface.

4. The assembly according to claim 3, wherein:

said plurality of lobes includes a set of first lobes, a set of second lobes and a set of third lobes;

each of said first lobes is positioned on said first member, each of said first lobes being positioned adjacent to said terminal end of a respective one of said halves of said first member;

each of said second lobes is positioned on said second member, said second lobes being spaced apart from each other;

each of said third lobes is positioned on said third member, said third lobes being spaced apart from each other;

each of said third lobes being aligned with a respective one of said second lobes;

said holes in each of said first lobes being directed toward each other;

said holes in each of said second lobes being directed toward each other; and said holes in each of said third lobes being directed toward each other.

5. The assembly according to claim 1, wherein said end cap has an outer surface and a front surface, said outer surface having a plurality of intersecting sides such that said end cap has a rectangular shape, each of said intersecting sides abutting an interior surface of a respective one of a plurality of faces of said bumper having said front surface closing said open end of said bumper.

6. The assembly according to claim 1, wherein said bracket comprises a central portion extending between a pair of outward portions, each of said outward portions being perpendicularly oriented with said central portion such that said bracket has a U-shape, each of said outward portions having a distal end with respect to said central portion, said bracket having a pair of bracket lobes each being integrated into said distal end of a respective one of said outward portions.

7. The assembly according to claim 6, wherein:

said plurality of lobes on said frame includes a set of first lobes, a set of second lobes and a set of third lobes; each of said first lobes, said second lobes and said third lobes having a hole extending therethrough;

each of said bracket lobes has a front surface and a back surface, each of said bracket lobes having an opening extending through said front surface and said back surface; and each of said bracket lobes is positioned between respective pairs of said second lobes and pairs of said third lobes, said opening in each of said bracket lobes being aligned with said holes in said respective second lobes and third lobes.

8. The assembly according to claim 7, further comprising a first pin being insertable through each of said holes in said second lobes and said opening in said bracket lobe which is positioned between said second lobes for pivotally attaching said bracket to said frame.

9. The assembly according to claim 8, further comprising a second pin being insertable through each of said holes in said third lobes and said opening in said bracket lobe which is positioned between said third lobes for pivotally attaching said bracket to said frame.

10. The assembly according to claim 4, further comprising a fastener being extendable through hole in each of said first lobes for urging said first lobes toward each other to tighten said frame around said bumper.

11. A bumper cap retention assembly for retaining a bumper cap on a recreational vehicle bumper, said assembly comprising:

an end cap being insertable into an open end of a bumper on a recreational vehicle, said end cap having an outer surface and a front surface, said outer surface having a plurality of intersecting sides such that said end cap has a rectangular shape, each of said intersecting sides abutting an interior surface of a respective one of a plurality of faces of said bumper having said front surface closing said open end of said bumper;

a frame having a width and a length being sufficient for extending around said bumper of said recreational vehicle, said frame comprising a plurality of members intersecting each other at right angles such that said frame defines a rectangle, said plurality of members including a first member, a second member and a third member, said first member extending between said second member and said third member such that said second member and said third member define opposite sides of said rectangle, said first member being divided into a pair of halves, each of said halves having a terminal end being directed toward each other, each of said members having an outwardly facing surface and an inwardly facing surface, each of said members extending along a respective one of said faces of said bumper having said inwardly facing surface of each of said members abutting an outer surface of said respective face, said frame having a plurality of lobes each extending outwardly from said frame, each of said lobes being positioned on said outwardly facing surface of a respective one of said members, each of said lobes having a first lateral surface and a second lateral surface, each of said lobes having a hole extending through said first lateral surface and said second lateral surface, said plurality of lobes including a set of first lobes, a set of second lobes and a set of third lobes, each of said first lobes being positioned on said first member, each of said first lobes being positioned adjacent to said terminal end of a respective one of said halves of said first member, each of said second lobes being positioned on said second member, said second lobes being spaced apart from each other, each of said third lobes being positioned on said third member, said third lobes being spaced apart from each other, each of said third lobes being aligned with a respective one of said second lobes, said holes in each of said first lobes being directed toward each other, said holes in each of said second lobes being directed toward each other, said holes in each of said third lobes being directed toward each other;

a bracket being positionable between respective ones of said lobes on said frame, said bracket being oriented to extend between respective members of said frame, said bracket extending across said end cap when said end cap is inserted into said open end of said bumper and said frame is positioned around said bumper thereby inhibiting said end cap from falling out of said open end of said bumper, said bracket comprising a central portion extending between a pair of outward portions, each of said outward portions being perpendicularly oriented with said central portion such that said bracket has a U-shape, each of said outward portions having a distal end with respect to said central portion, said bracket having a pair of bracket lobes each being integrated into said distal end of a respective one of said outward portions, each of said bracket lobes having a front surface and a back surface, each of said bracket lobes having an opening extending through said front surface and said back surface, each of said bracket lobes being positioned between respective pairs of said second lobes and pairs of said third lobes, said opening in each of said bracket lobes being aligned with said holes in said respective second lobes and third lobes;

a first pin being insertable through each of said holes in said second lobes and said opening in said bracket lobe which is positioned between said second lobes for pivotally attaching said bracket to said frame;

a second pin being insertable through each of said holes in said third lobes and said opening in said bracket lobe which is positioned between said third lobes for pivotally attaching said bracket to said frame; and a fastener being extendable through hole in each of said first lobes for urging said first lobes toward each other to tighten said frame around said bumper.

\* \* \* \* \*